United States Patent
Kojima et al.

(10) Patent No.: US 8,711,319 B2
(45) Date of Patent: Apr. 29, 2014

(54) LIQUID CRYSTAL DISPLAY DEVICE

(75) Inventors: Shigeru Kojima, Kanagawa (JP);
Yutaka Nakagawa, Kanagawa (JP);
Toru Tsukamoto, Hyogo (JP); Kenji Gondo, Tokyo (JP)

(73) Assignee: Optrex Corporation, Tokyo (JP)

( * ) Notice: Subject to any disclaimer, the term of this patent is extended or adjusted under 35 U.S.C. 154(b) by 347 days.

(21) Appl. No.: 13/090,293

(22) Filed: Apr. 20, 2011

(65) Prior Publication Data

US 2011/0261310 A1 Oct. 27, 2011

(30) Foreign Application Priority Data

Apr. 26, 2010 (JP) ................................. 2010-101004
Mar. 16, 2011 (JP) ................................. 2011-058537

(51) Int. Cl.
*G02F 1/1345* (2006.01)

(52) U.S. Cl.
USPC ............................................ 349/151; 349/40

(58) Field of Classification Search
None
See application file for complete search history.

(56) References Cited

U.S. PATENT DOCUMENTS 6,141,075 A 10/2000 Ohmuro et al.
8,013,943 B2 * 9/2011 Tanaka et al. .................. 349/12

FOREIGN PATENT DOCUMENTS

| EP | 0 538 796 A1 | 10/1992 |
| JP | 5-113561 A | 5/1993 |
| JP | 10-123576 A | 5/1998 |

* cited by examiner

*Primary Examiner* — Richard Kim
(74) *Attorney, Agent, or Firm* — Leydig, Voit & Mayer

(57) ABSTRACT

A liquid crystal display device restraining display defects even in a structure having a potential difference between an externally-connected electrode potential and the mean potential of the drive waveform of a liquid crystal material. An electrostatic charge stored in the vicinity of a liquid crystal layer of the liquid crystal display device as a result of the potential difference between an externally-connected electrode potential and the mean potential of the drive waveform of the liquid crystal material is dispersed by employing a capacitor or an arrester connected to ground. Accordingly, discharge of the stored charge is facilitated, and occurrence of display defects is restrained.

5 Claims, 10 Drawing Sheets

LIQUID CRYSTAL DISPLAY DEVICE

CROSS-REFERENCE TO RELATED APPLICATION

The entire disclosure of the Japanese Patent Applications No. 2010-101004 filed on Apr. 26, 2010, and No. 2011-58537 filed Mar. 16, 2011, including specification, claims, drawings and summary, respectively, on which the Convention priority of the present application is based, are incorporated herein in its entirety.

BACKGROUND OF THE INVENTION

1. Field of the Invention

The present invention relates to a liquid crystal display device.

2. Background Art

In a liquid crystal display device, a liquid crystal layer is sandwiched between a transparent substrate placed on the side of an observer and a transparent substrate that faces the other transparent substrate and is placed on the opposite side from the observer. The polarization state of light being transmitted through the liquid crystal layer is controlled in accordance with the electric field induced between electrodes provided on the inner sides of the respective substrates. A pair of polarizing plates is also provided: one is placed on the observer's side of the two substrates, and the other is placed on the opposite side of the two substrates from the observer's side.

Liquid crystal display devices are classified into several modes, depending on the initial alignment state of the liquid crystal layer and on the operating state and alignment state of the liquid crystal layer at the time of application of voltage. For example, the VA (Vertical Alignment) mode is used in liquid crystal display devices used for liquid crystal television sets and in liquid crystal display devices for vehicles such as instrument panels (see Japanese Patent Application Laid-Open Nos. 5-113561 and 10-123576, for example).

In the VA mode, the contrast ratio is high when the display is viewed from the front, and the viewing angle is wide. Accordingly, the VA mode allows excellent visibility.

In the VA mode, the liquid crystal layer sandwiched between the substrates is a nematic liquid crystal layer having negative dielectric constant anisotropy ($\Delta\epsilon$) substantially perpendicular to the substrates in the initial alignment state (vertical alignment). A pair of polarizing plates is placed to sandwich the liquid crystal layer, so as to form a crossed Nicol prism in the normal state. When a voltage is applied to the liquid crystal layer via electrodes, the alignment of the liquid crystals is changed and is tilted in accordance with the field intensity, so that the liquid crystal molecules become perpendicular to the electric field or the alignment direction of the liquid crystals become parallel to the substrates. As a result, a difference in the light transmission properties determined by the product ($\Delta n \cdot d$) of the refractive index anisotropy ($\Delta n$) of the liquid crystals and the thickness (d) of the liquid crystal layer, particularly a difference in color, appears between the portion to which the voltage is applied and the portion to which the voltage is not applied. In a liquid crystal display device, desired display is performed by taking advantage of such characteristics.

As described above, in the VA mode, the liquid crystal layer has negative dielectric constant anisotropy. Therefore, liquid crystals having negative dielectric constant anisotropy are used. Known examples of such liquid crystals include those containing a cyano group in the molecular structure thereof. However, such liquid crystals have a high viscosity, and the high viscosity significantly lowers the response speed of the liquid crystals while the liquid crystal display device is being operated. Such liquid crystals have low reliability and poor heat-resisting properties. Further, it is difficult to remove impurities from such liquid crystals. As a result, the performance and stability of the liquid crystals are easily degraded. Meanwhile, liquid crystals containing fluorine atoms in the molecule structure thereof are also known to have negative dielectric constant anisotropy. Such liquid crystals have a low viscosity, and the low viscosity can increase the response speed of the liquid crystals while the liquid crystal display device is being operated. Such liquid crystals have high reliability and excel in heat-resisting properties. Further, it is easy to purify such liquid crystals. Accordingly, in the VA mode, fluorine-containing liquid crystals are selected, and a liquid crystal layer is normally formed by using the fluorine-containing liquid crystals.

When the protection resin film formed on the surface of a liquid crystal display device is peeled off, or when an electrically charged user touches a liquid crystal display device, static electricity is generated in the surface of the liquid crystal display device. A voltage generated by the static electricity is then applied to the liquid crystal layer, and the alignment of the liquid crystals is changed. As a result, a portion that is not originally intended to be displayed is displayed (this phenomenon will be hereinafter referred to as a "display defect"). Particularly, a liquid crystal layer formed by using fluorine-containing liquid crystals has a high resistivity, since the liquid crystals have a high purity. Therefore, it is difficult to release the static electricity through the liquid crystal layer. As a result, a display defect often occurs in the liquid crystal display device.

Display defects are affected by the electrode patterns of liquid crystal display devices.

For example, in a liquid crystal television set of the active matrix type, a dot matrix structure is used. This structure has a relatively high aperture ratio, and electrodes are densely arranged in the display unit. Therefore, even if static electricity is generated in the surface of such a liquid crystal display device, the static electricity can be scattered through the electrodes. Also, an abnormally lighted portion or a portion that is not originally intended to be displayed is covered with the black mask of color filters. Accordingly, display defects can be made difficult to be seen from an observer.

On the other hand, in a liquid crystal display device of the passive matrix type that can display characters, the problem of display defects due to static electricity can easily become evident. A structure used for displaying characters is not a dot matrix structure in which electrodes are densely arranged. In the structure used for displaying characters, the aperture ratio of the display unit is 70% or lower, and the area in which electrodes are not formed is large in the display unit. Therefore, it is difficult to scatter static electricity through electrodes, and direct-current charges are localized to cause a display defect due to abnormal lighting. From the viewpoint of an observer, portions that are originally intended to be displayed and portions that are not originally intended to be displayed are both displayed on the screen. This results in poorer display performance.

Furthermore, many liquid crystal display devices of the passive matrix type do not use color filters. Therefore, to conceal abnormal lighting of a portion that is not originally intended to be displayed, a black mask needs to be additionally prepared, and, as a result, the production costs become much higher.

As one of the techniques for reducing such display defects, adding a substance that reduces the resistivity of liquid crystals to the liquid crystals has been suggested. However, it has already become apparent that sufficient restraint of display defects cannot be expected from such a technique.

Also, there has been a suggested structure in which an external ITO (Indium Tin Oxide) electrode is formed on an outer side of one of the substrates in a liquid crystal display device, so that the voltage generated by static electricity is not applied to the liquid crystal layer. For example, a metal frame is provided on the outer rim of the liquid crystal display device, and the external ITO electrode and the metal frame are electrically connected to each other via a conductive elastic material. Since the metal frame is grounded, static electricity can be discharged from the external ITO electrode through the conductive elastic material and the metal frame, even if the static electricity is generated on the side of the one of the substrates.

In the case of a structure having an external electrode, however, a potential difference appears between the external electrode and an electrode provided on the inner sides of the substrates forming the liquid crystal display device, if there is a difference between the externally-connected electrode potential and the mean potential of the drive waveform of the liquid crystals. After the liquid crystal display device is used over a long period of time, the ionic substances in the liquid crystals move to cause internal polarization, and display defects occur even without a voltage generated by static electricity. Such display defects are even more conspicuous at high temperatures.

In some cases, the electric connection of the metal frame serving as the outer rim of the liquid crystal display device to the external ITO electrode is considered undesirable.

The present invention has been made in view of the above circumstances. Specifically, the present invention provides a liquid crystal display device that can restrain the occurrence of display defects even in a structure having a difference between an externally connected electrode potential and the mean potential of the drive waveform of liquid crystals.

Other challenges and advantages of the present invention are apparent from the following description.

SUMMARY OF THE INVENTION

The present invention describes a liquid crystal display device capable of avoiding defects, said device comprising: a pair of substrates that face each other; a liquid crystal layer sandwiched between the two substrates; a pair of electrodes that face each other via the liquid crystal layer; a drive circuit connected to each of the two electrodes; an external electrode placed on at least one of the two substrates, the external electrode being positioned on the opposite side from the liquid crystal layer; and a capacitor connected to the external electrode, the external electrode being grounded via the capacitor.

In another embodiment of this invention, a liquid crystal display device capable of avoiding defects, said device comprising: a pair of substrates that face each other; a liquid crystal layer sandwiched between the two substrates; a pair of electrodes that face each other via the liquid crystal layer; a drive circuit connected to each of the two electrodes; an external electrode placed on at least one of the two substrates, the external electrode being positioned on the opposite side from the liquid crystal layer; and an arrester connected to the external electrode, the external electrode being grounded via the arrester.

In another embodiment of this invention, a liquid crystal display device, said device comprising: a pair of substrates that facing each other; a liquid crystal layer sandwiched between the two substrates; a pair of electrodes that face each other via the liquid crystal layer; a drive circuit connected to each of the two electrodes; an external electrode placed on at least one of the two substrates, the external electrode being positioned on the opposite side from the liquid crystal layer; and a circuit unit that includes a capacitor and at least one zener diode, each of the capacitor and at least one zener diode being connected to the external electrode, the capacitor being connected to a ground.

DETAILED DESCRIPTION OF THE EMBODIMENTS

A liquid crystal display device according to this embodiment has a passive matrix structure. That is, a switching element such as a TFT (thin film transistor) is not provided in each of the pixels constituting an image display, and a desired image is displayed through passive driving with the use of an electrode layer. Although a liquid crystal display device of the VA mode will be described as an example in this embodiment, the present invention may be applied to liquid crystal display devices of any other mode.

Figure 1A:
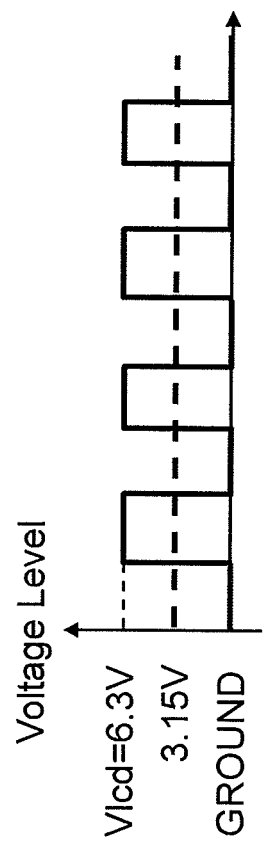
FIG. 1A shows the drive waveform of a segment electrode.
Figure 1B:
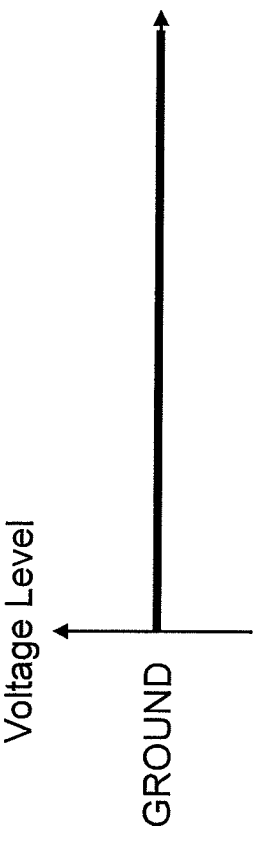
FIG. 1B shows the potential of the later described external ITO electrode.

FIG. 1A shows the drive waveform of a segment electrode. In this example, the mean potential is 3.15 V. FIG. 1B shows the potential of the later described external ITO electrode. In view of ESD (Electrostatic Discharge), an ITO electrode is normally grounded, and therefore, the potential of the external ITO electrode is 0 V. As described above, the drive waveform of the segment element is constantly at higher potentials than the ground potential. Therefore, in the case of FIGS. 1A and 1B, a voltage of 3.15 V, which is the mean potential, is constantly applied to the liquid crystal layer.

Figure 2A:
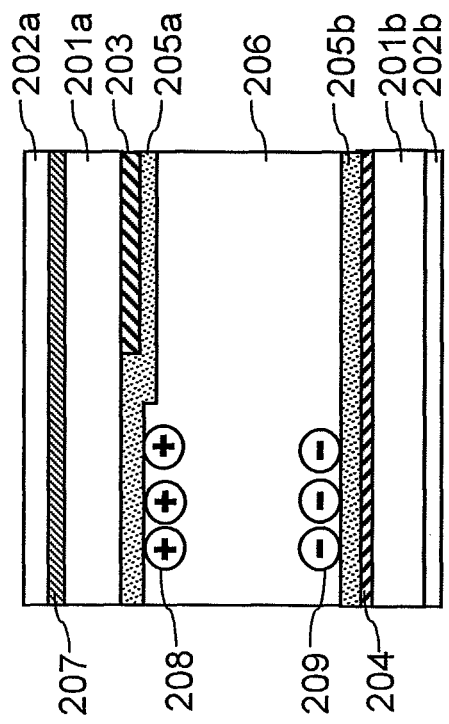
FIG. 2A is a schematic view showing the charges immediately after energizing is performed to activate the liquid crystals.
Figure 2B:
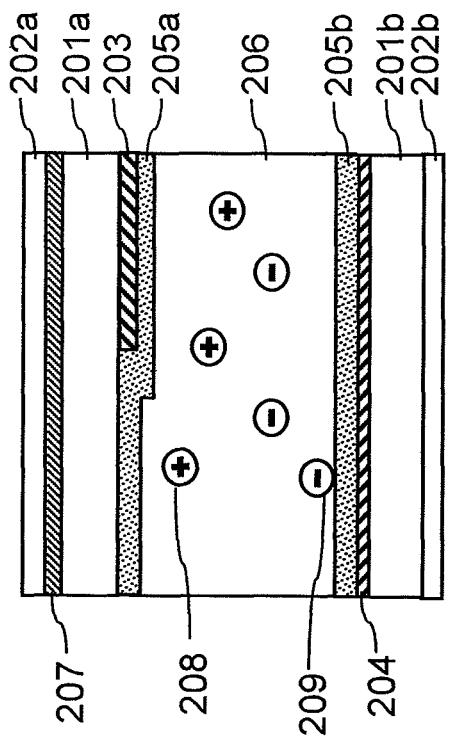
FIG. 2B is a schematic view showing the charges after a predetermined period of time has passed since the start of the energizing.

FIGS. 2A and 2B are partial cross-sectional views of the liquid crystal display device. In those drawings, reference numerals 201a and 201b denote substrates, reference numerals 202a and 202b denote polarizing plates, reference numeral 203 denotes a common electrode, reference numeral 204 denotes the segment electrode, reference numerals 205a and 205b denote alignment films, reference numeral 206 denotes a liquid crystal layer, and reference numeral 207 denotes the external ITO electrode.

FIG. 2A is a schematic view showing the charges immediately after energizing is performed to activate the liquid crystals. The liquid crystals contain a positively charged ionic substance 208 and negatively charged ionic substance 209 as a very small amount of impurities. Those substances are scattered in the liquid crystals when a voltage is not being applied to the liquid crystal layer 206. When a voltage is applied to the liquid crystal layer 206, the ionic substances contained in the liquid crystals start moving in accordance with the direct-current electric field induced between the external ITO electrode 207 and the segment electrode 204. That is, as shown in FIG. 2A, the positively-charged ionic substance 208 starts moving toward the portion of the alignment film 205a not having the common electrode 203 formed thereon, and the negatively-charged ionic substance 209 starts moving toward the segment electrode 204. This is because, when a voltage is applied to the liquid crystal layer 206 from the common electrode 203 and the segment electrode 204 to activate the liquid crystals, the voltage of 3.15 V in mean potential is applied between the external ITO electrode 207 and the segment electrode 204, as explained with reference to FIGS. 1A and 1B.

FIG. 2B is a schematic view showing the charges after a predetermined period of time has passed since the start of the energizing. As the energizing of the liquid crystal layer 206 is continued, the positively-charged ionic substance 208 gathers on the surface of the portion of the alignment film 205a not having the common electrode 203 formed thereon. Meanwhile, the negatively charged ionic substance 209 gathers on the surface of the segment electrode 204. When the internal polarization in the liquid crystals exceeds the threshold voltage of the liquid crystals, so-called abnormal lighting occurs between the portion of the alignment film 205a not having the common electrode 203 formed thereon and the segment electrode 204. That is, lighting occurs in a region that is not originally intended to be displayed, and therefore, a display defect occurs in the liquid crystal display device. Such a phenomenon often occurs particularly at high temperatures. This is supposedly because, at high temperatures, the viscosity of liquid crystals becomes lower, and the impurities freely move about in the liquid crystals. Also, at high temperatures, the optimum voltage for activating liquid crystals becomes lower, and the threshold voltage at which abnormal lighting occurs also becomes lower. Therefore, when there is constant voltage supplied from the drive circuit of the liquid crystal display device, a display defect often occurs at high temperatures.

Next, the structures of liquid crystal display devices according to embodiments of the present invention are described.

First Embodiment

Figure 3:
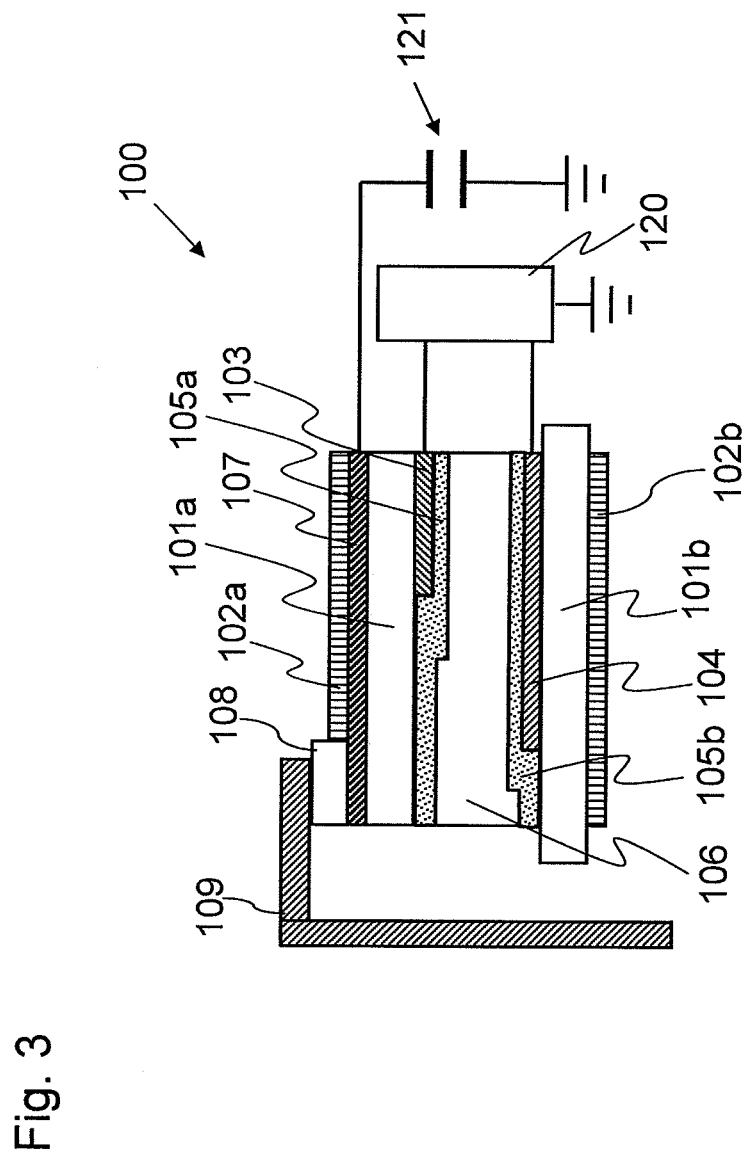
FIG. 3 is a schematic cross-sectional view of a liquid crystal display device 100 according to a first embodiment of the present invention.

FIG. 3 is a schematic cross-sectional view of a liquid crystal display device 100 according to a first embodiment of the present invention. The liquid crystal display device 100 is a liquid crystal display device of the VA mode. In this embodiment, however, the liquid crystal display device 100 may be of a TN (Twisted Nematic) mode or a STN (Super-Twisted Nematic) mode, and is not limited thereto.

As shown in FIG. 3, the liquid crystal display device 100 includes a pair of transparent glass substrates 101a and 101b, a liquid crystal layer 106 that is sandwiched by the substrates formed by liquid crystals, and a pair of polarizing plates 102a and 102b that are positioned on the opposite sides of the respective substrates from the liquid crystal layer 106.

Examples of glass substrates include inorganic glass substrates made of alkali glass, alkali-free glass, or quartz glass. The substrates 101a and 101b are not limited to glass substrates, and may be substrates made of some other material having a high transmittance for visible light. For example, such substrates may be made of a transparent resin such as polyester, polycarbonate, polyether, polysulfone, polyethersulfone, polyvinyl alcohol, or a fluorine-containing polymer such as polyvinyl fluoride. However, substrates made of inorganic glass are preferable, having a high upper temperature limit and high rigidity.

The thickness of each of the substrates 101a and 101b is not particularly limited, but is normally 0.2 to 1.5 mm, and preferably, 0.3 to 1.1 mm. A surface treatment layer made of an inorganic or organic material may be provided on each of the substrates 101a and 101b as needed, so as to prevent alkaline elution, improve adhesiveness, prevent reflection, provide a hard coating, or the like.

A common electrode 103 is attached to the substrate 101a, and a segment electrode 104 is attached to the substrate 101b. The common electrode 103 and the segment electrode 104 are both ITO electrodes, and have been subjected to patterning so as to be capable of displaying desired images. The common electrode 103 and the segment electrode 104 are both connected to an external drive circuit 120. Alternatively, a segment electrode may be attached to the substrate 101a, and a common electrode may be attached to the substrate 101b.

The substrates 101a and 101b also have alignment films 105a and 105b formed along the surfaces facing each other. Those alignment films 105a and 105b are vertically aligned. The liquid crystals have negative dielectric constant anisotropy, and are aligned perpendicularly to the substrates 101a and 101b in the initial alignment state. In this liquid crystal display device 100, a voltage is applied to the liquid crystal layer 106 from the common electrode 103 and the segment electrode 104, and the liquid crystals are tilted to be parallel to the substrates 101a and 101b. The optical anisotropy of the liquid crystal layer 106 then changes, and an image is displayed.

Each of the alignment films 105a and 105b is produced by forming a film of an alignment film material, (for example: trade name: A-8530, manufactured by Chisso Corporation) on a substrate by a flexographic printing method, and then baking the film at 180° C. The thickness of each of the alignment films 105a and 105b can be arbitrarily set, and may be approximately 600 angstroms, for example. The surfaces of the alignment films 105a and 105b are subjected to soft rubbing, to fix the moving directions of the liquid crystals at the time of application of an electric field.

The alignment films 105a and 105b should have the function to align the liquid crystals, and films other than the above described ones may be used. Specifically, materials can be selected in accordance with the specification of each liquid crystal display device. Examples of such materials include organic materials such as polyimide, polyamide, polyvinyl alcohol, polyvinyl cinnamate, and polystyrene, and inorganic materials such as $SiO_2$ and $Al_2O_3$. Other than the rubbing process, it is possible to use a SiO oblique vapor deposition method, an ion beam method, or a photo-alignment method in the aligning process.

An external ITO electrode 107 is provided on the surface of the substrate 101a on the observer's side. The external ITO electrode 107 can be formed on the entire surface of the substrate 101a on the observer's side. The liquid crystal display device 100 as the first embodiment of the present invention also includes a capacitor 121 that is provided outside. The external ITO electrode 107 provided on the substrate 101a is grounded via the capacitor 121.

The polarizing plate 102a is provided on the external ITO electrode 107, and is designed to have such a size as not to cover the entire surface of the external ITO electrode 107. An insulating spacer 108 is provided on the portion of the external ITO electrode 107 on which the polarizing plate 102a is not provided. A bezel 109 is provided around the components such as the substrates 101a and 101b. The bezel 109 serves as the outer rim of the liquid crystal display device 100.

A polarizing plate (for example: trade name: SHC-13UL2SZ9, manufactured by Polatechno Co., Ltd.) can be used as the polarizing plate 102a, and a polarizing plate (for example: trade name: 000R220N-SH38L2S, manufactured by Polatechno Co., Ltd.) can be used as the polarizing plate 102b. In that case, the polarizing plates 102a and 102b are positioned so that the counterclockwise angle θ1 between a reference axis and the absorption axis of the polarizing plate 102a becomes 45 degrees, and the counterclockwise angle θ2 between the reference axis and the absorption axis of the polarizing plate 102b becomes 135 degrees, when viewed from the observer's side. After that, a protection resin film (not shown) is provided on each of the polarizing plates 102a and 102b.

The liquid crystal display device 100 of this embodiment includes the capacitor 121, as described above. The external ITO electrode 107 is grounded via the capacitor 121. By virtue of the capacitor 121, the internal polarization caused in the liquid crystal layer 106 by the driving of the liquid crystal display device 100 can be reduced. Also, the charges induced by ESD (Electrostatic Discharge) can be separated.

The segment electrode 104 and the common electrode 103 are grounded via the drive circuit 120. With this arrangement, a capacitor structure is positioned between the external ITO electrode 107 and the segment electrode 104 on the substrate 101b. The capacitor 121 is connected in parallel to the virtual capacitor structure. Accordingly, in the liquid crystal display device 100, the charges stored in the capacitor formed between the external ITO electrode 107 and the segment electrode 104 on the substrate 101b can be dispersed by the capacitor 121. As a result, the internal polarization that occurs in the liquid crystal layer 106 of the liquid crystal display device 100 is reduced, and abnormal lighting of the liquid crystal display device 100 can be minimized.

The capacitance of the capacitor 121 in the liquid crystal display device 100 should preferably be equal to or larger than the capacitance of the above described capacitor formed between the external ITO electrode 107 and the segment electrode 104. More preferably, the capacitance of the capacitor 121 should be ten or more times larger than the capacitance of the capacitor formed between the external ITO electrode 107 and the segment electrode 104.

A desirable capacitance of the capacitor 121 is estimated herein. Here, the external ITO electrode 107 is provided on the entire surface of the substrate 101a on the observer's side. The segment electrode 104 has a size of 10 cm$^2$, which is the same area as the area of the external ITO electrode 107. The substrate 101a is a glass substrate of 0.7 mm in thickness. In such a case, the capacitance of the capacitor formed between the external ITO electrode 107 and the segment electrode 104 can be estimated to be approximately 60 pF.

Accordingly, where the capacitance of the capacitor 121 is ten times larger than the capacitance of the capacitor formed between the external ITO electrode 107 and the segment electrode 104, the electric field induced between the external ITO electrode 107 and the segment electrode 104 on the substrate 101b can be made $\frac{1}{10}$ or less of the electric field induced in a case where the capacitor 121 is not provided. Specifically, the capacitance of the capacitor 121 can be 600 pF, which is ten times larger than the above estimated value. With this arrangement, the internal polarization in the liquid crystal layer 106 in the liquid crystal display device 100 can be $\frac{1}{10}$ or less of the internal polarization of the case where the capacitor 121 is not provided.

Figure 4:
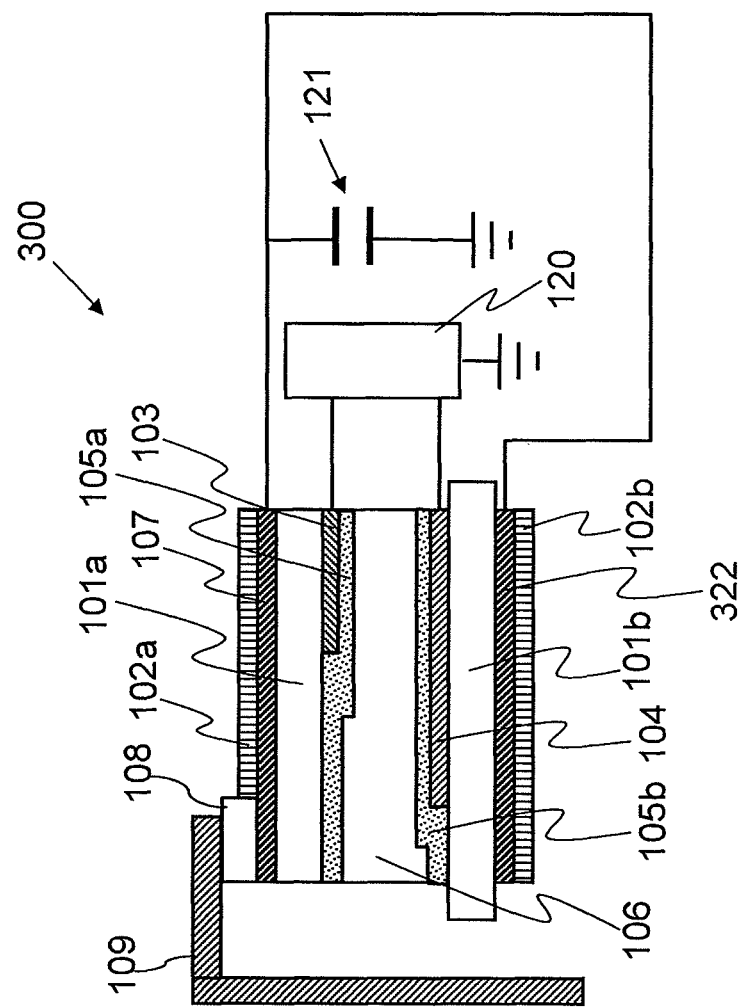
FIG. 4 shows another example of the liquid crystal display device according to the first embodiment of the present invention.

In the example shown in FIG. 3, the external ITO electrode 107 is provided on the surface of the substrate 101a on the observer's side. According to the present invention, however, an external ITO electrode may be provided on either outer side of the pair of substrates. Referring now to FIG. 4, a liquid crystal display device having such a structure is described.

FIG. 4 shows another example of the liquid crystal display device according to the first embodiment of the present invention. In FIG. 4, the same components as those shown in FIG. 3 are denoted by the same reference numerals as those used in FIG. 3.

In the liquid crystal display device 300 shown in FIG. 4, an external ITO electrode 322 is provided between the substrate 101b and the polarizing plate 102b. The external ITO electrode 322 is connected to the external ITO electrode 107 on the side of the substrate 101a, and grounded via the capacitor 121.

Where the external ITO electrode 322 is provided on the substrate 101b as described above, the external ITO electrode 107 on the substrate 101a and the external ITO electrode 322 on the substrate 101b have the same potentials. Accordingly, abnormal lighting in the liquid crystal layer 106 sandwiched between the substrate 101a and the substrate 101b can be prevented. Also, as the external ITO electrodes 107 and 322 are connected to the capacitor 121, the charges stored between the external ITO electrodes 107 and 322 and the common electrode 103 on the substrate 101a and the segment electrode 104 on the substrate 101b can be dispersed by the capacitor 121.

Second Embodiment

Figure 5:
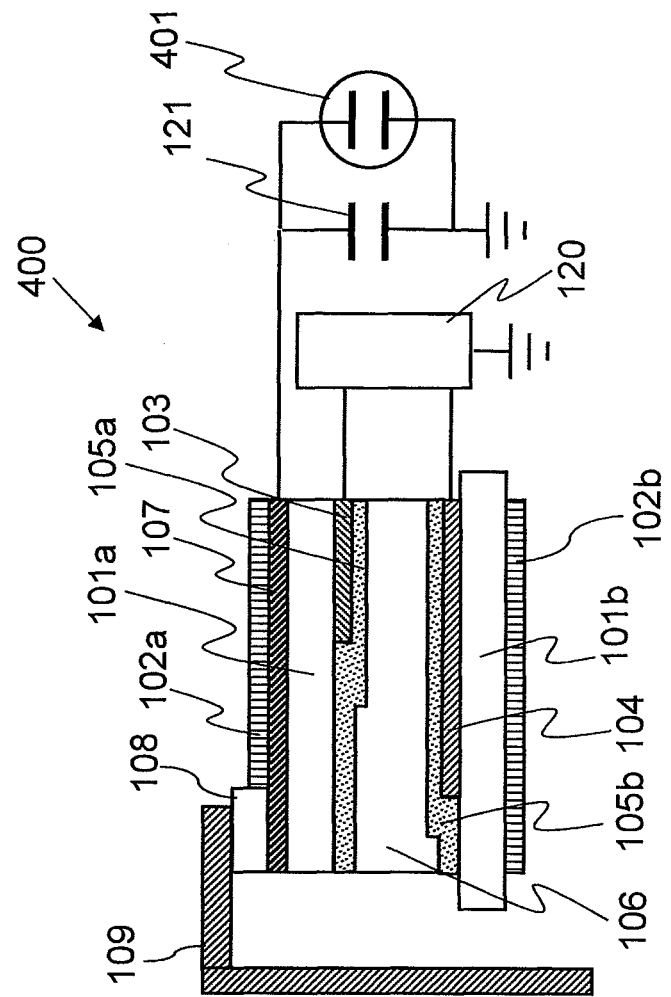
FIG. 5 shows a liquid crystal display device according to a second embodiment of the present invention.

FIG. 5 shows a liquid crystal display device according to a second embodiment of the present invention. This liquid crystal display is another example of the present invention.

The liquid crystal display device 400 shown in FIG. 5 includes a capacitor 121, like the liquid crystal display device 100 shown in FIG. 3. An external ITO electrode 107 is grounded via the capacitor 121. The liquid crystal display device 400 further includes an arrester 401 that is a component prepared for ESD (electrostatic discharge). The arrester 401 is connected in parallel to the capacitor 121. In FIG. 5, the same components as those shown in FIG. 3 are denoted by the same reference numerals as those used in FIG. 3.

In the liquid crystal display device 400, the arrester 401 is an electronic part that prevents damage to the circuit due to abnormally high voltage. That is, the arrester 401 functions to purposefully form a portion with poor insulating properties in the circuit. This portion is broken by an abnormally high voltage, so that the current is caused to bypass the circuit, and the circuit structure is protected. After the application of the abnormally high voltage is ended, the arrester 401 immediately recovers the original insulating properties.

A surge arrester (for example: trade name: G31-A75X, manufactured by EPCOS AG) designed for ESD protection can be used as the arrester 401. In that case, the insulation resistance value of the arrester 401 is 1 GΩ or higher, but the arrester 401 becomes conductive when an abnormally high voltage is applied thereto.

In the liquid crystal display device 400 having the above structure, the charges stored between the external ITO electrode 107 and the segment electrode 104 on the substrate 101b can be dispersed by the capacitor 121. Even if an abnormally high voltage is applied between the external ITO electrode 107 and the segment electrode 104 on the substrate 101b or to the capacitor 121, the current can bypass the circuit structure and escape to the ground. Accordingly, the internal polarization in the liquid crystal layer 106 can be reduced, and abnormal lighting of the liquid crystal display device 400 can be minimized.

In a liquid crystal display device having the structure shown in FIG. 5, an external ITO electrode may be provided on either outer side of the pair of substrates, as in the liquid crystal display device 300 shown in FIG. 4. In such a structure, the external ITO electrodes placed on both outer sides of the pair of substrates have the same potentials, and accordingly, abnormal lighting of the liquid crystal layer can be prevented. Also, as the external ITO electrodes are connected to a capacitor, the charges stored between the external ITO electrodes and the common electrode and the segment electrodes on the substrates can be dispersed by the capacitor. Further, even if an extremely high voltage is applied between the external ITO electrodes and the segment electrode and the common electrode on the substrates or to the capacitor located outside, the arrester can cause the current to bypass the circuit structure and escape to the ground.

Figure 6:
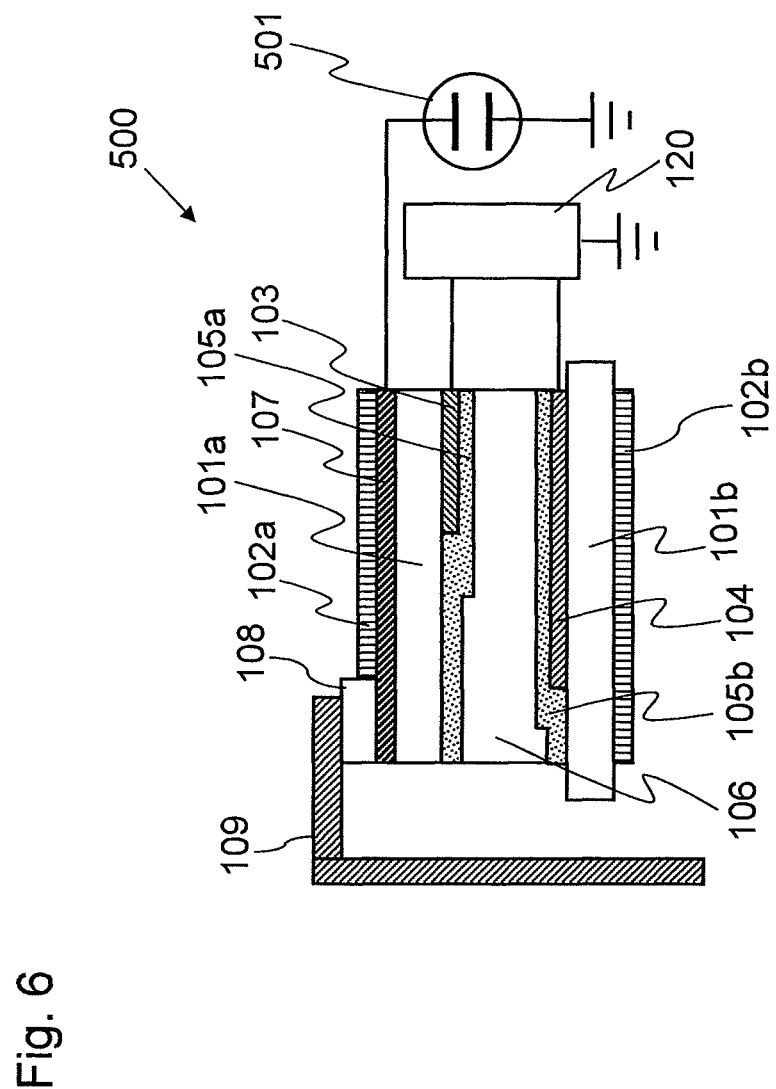
FIG. 6 shows another example of the liquid crystal display device according to the second embodiment of the present invention.

FIG. 6 shows another example of the liquid crystal display device according to the second embodiment of the present invention.

The above described liquid crystal display device 100 shown in FIG. 3 includes the capacitor 121, and has the external ITO electrode 107 grounded via the capacitor 121. In the liquid crystal display device 500 shown in FIG. 6, on the other hand, an arrester 501 as a component prepared for ESD, instead of the capacitor 121, is grounded. In FIG. 6, the same components as those shown in FIG. 3 are denoted by the same reference numerals as those used in FIG. 3.

As described above, the arrester 501 functions to purposefully form a portion with poor insulating properties in the circuit. This portion is broken by an abnormally high voltage, and the current is caused to bypass this portion. In this manner, the abnormally high voltage is restrained, and the essential circuit structure is protected. After the application of the abnormally high voltage is ended, the arrester 501 immediately recovers the original insulating properties.

To prevent charge accumulation between the external ITO electrode 107 and the segment electrode 104, the external ITO electrode 107 should not be fixed at a certain potential, but should be put into an electrically floating state. That is, the arrester 501 is not necessarily connected in parallel to a capacitor as in the liquid crystal display device 400 shown in FIG. 5, but the arrester 501 may be used without the capacitor, as in the liquid crystal display device 500 shown in FIG. 6.

In the liquid crystal display device 500, a surge arrester (for example: trade name: G31-A75X, manufactured by EPCOS AG) can be used as the arrester 501, as in the liquid crystal display device 400 shown in FIG. 5. In that case, the insulation resistance value of the arrester 501 is 1 GΩ or higher, and the capacitance is 1 pF or lower. During regular operations of the liquid crystal display device 500, the arrester 501 functions as if a capacitor with an extremely low capacitance were connected to the external ITO electrode 107. Meanwhile, the arrester 501 becomes conductive when a transitional abnormally high voltage is applied thereto.

In the liquid crystal display device 500 having the above described structure, only when the charges stored in the capacitor formed between the external ITO electrode 107 and the segment electrode 104 turn into a high voltage, the arrester 501 functions to cause the current to bypass the circuit structure, and cause the charges to escape to the ground. As a result, the internal polarization in the liquid crystal layer 106 is reduced, and abnormal lighting of the liquid crystal display device 500 is minimized.

In a liquid crystal display device having the structure shown in FIG. 6, an external ITO electrode may be provided on either outer side of the pair of substrates, as in the liquid crystal display device 300 shown in FIG. 4. In such a structure, the external ITO electrodes placed on both outer sides of the pair of substrates have the same potentials, and accordingly, abnormal lighting of the liquid crystal layer can be prevented. Also, even if charges are stored between the external ITO electrodes and the common electrode and the segment electrode on the substrates, and an extremely high voltage is applied between the external ITO electrodes and the segment electrode and the common electrode on the substrates, the arrester can cause the current to bypass the circuit structure and escape to the ground.

As described above, according to the first and second embodiments of the present invention, even in a structure having a difference between an externally connected potential and the mean potential of the drive waveform of liquid crystals, the charges stored in the vicinity of the liquid crystal layer can be dispersed by employing a capacitor or an arrester connected to the ground. Accordingly, discharge of the stored charges can be facilitated, and occurrence of display defects can be restrained. Each of the structures according to the first and second embodiments of the present invention are particularly effective in a VA-mode liquid crystal display device of the passive matrix type in which a liquid crystal layer having negative dielectric constant anisotropy ($\Delta \in$) substantially perpendicular to substrates (vertical alignment) in the initial alignment state is sandwiched between the substrates.

Third Embodiment

Figure 7:
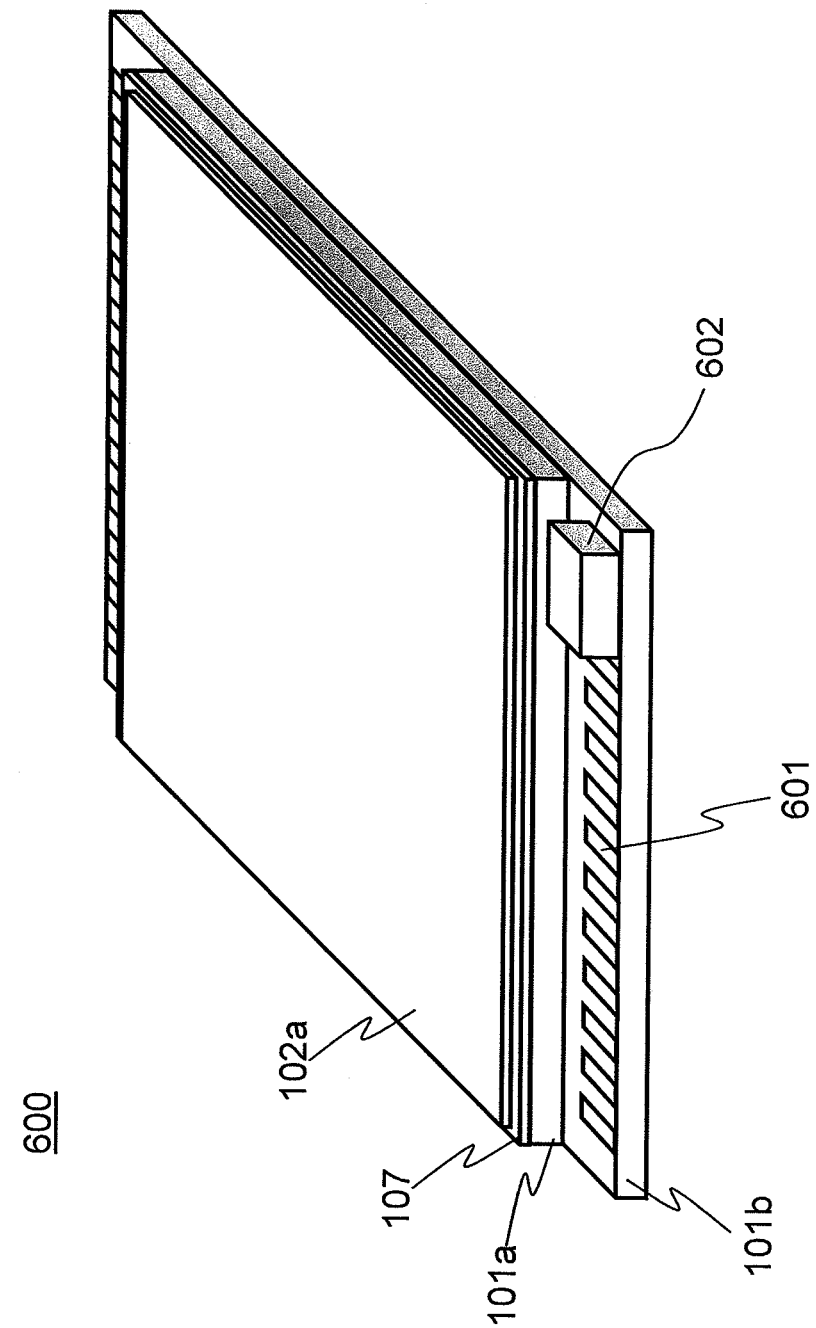
FIG. 7 is a schematic perspective view for explaining the structure of a liquid crystal display device according to a third embodiment of the present invention.

FIG. 7 is a schematic perspective view for explaining the structure of a liquid crystal display device according to a third embodiment of the present invention.

Figure 8:
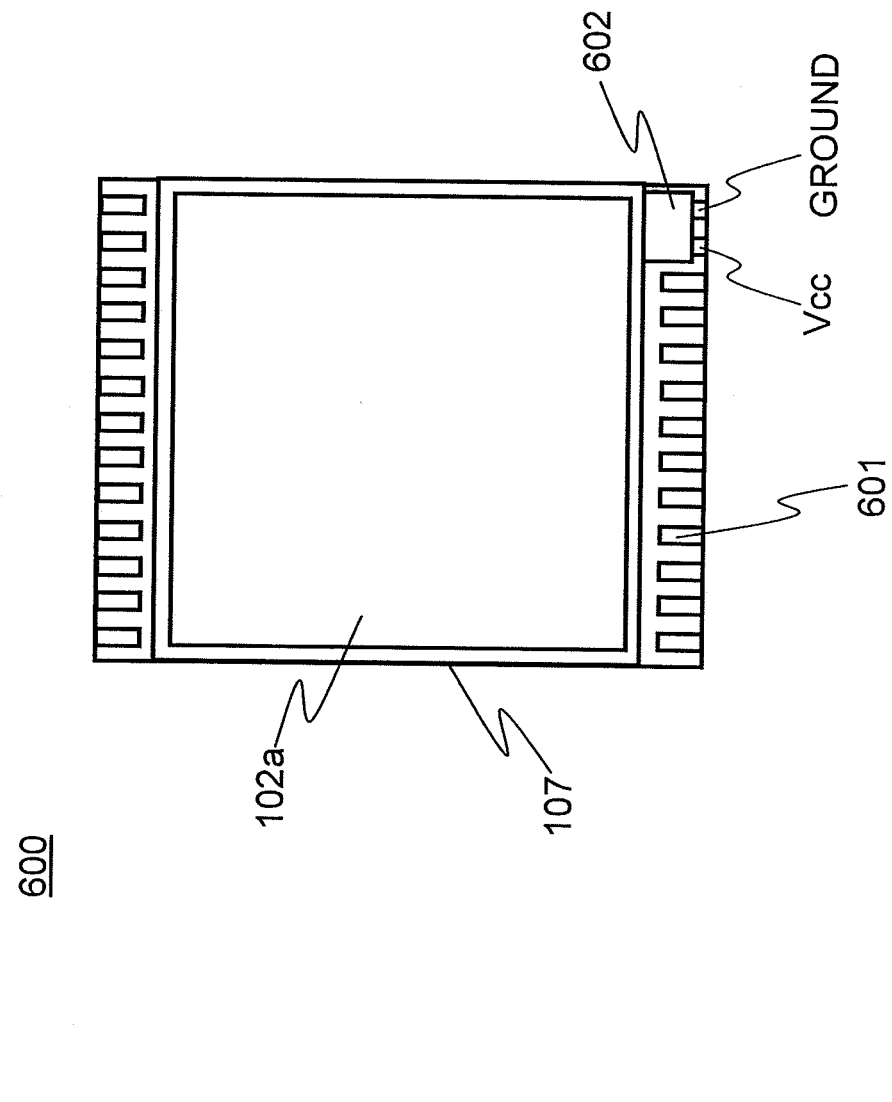
FIG. 8 is a schematic plan view for explaining the structure of the liquid crystal display device according to the third embodiment of the present invention.

FIG. 8 is a schematic plan view for explaining the structure of the liquid crystal display device according to the third embodiment of the present invention.

As will be described later, the liquid crystal display device 600 of the third embodiment shown in FIGS. 7 and 8 is a VA-mode liquid crystal display device, like the liquid crystal display device 100 of the first embodiment described with reference to FIG. 3. Therefore, explanation of the same aspects as those of the display device 100 will not be repeated, and the aspects characteristic of this embodiment will be described in the following. In FIG. 7 and others showing the liquid crystal display device 600, the same components as those of the liquid crystal display device 100 of the first embodiment are denoted by the same reference numerals as those used in FIG. 3.

The liquid crystal display device 600 of this embodiment is a liquid crystal display device of the VA mode having the same structure as that of the liquid crystal display device 100 of the above-described first embodiment. In this embodiment, however, the liquid crystal display device 600 may be of the TN (Twisted Nematic) mode or the STN (Super-Twisted Nematic) mode, and is not limited thereto.

As shown in FIG. 7, the liquid crystal display device 600 includes a pair of transparent glass substrates 101*a* and 101*b*, a liquid crystal layer (not shown) that is sandwiched between those substrates and is formed by liquid crystals, a polarizing plate 102*a* placed on the surface on the opposite side of the substrate 101*a* from the liquid crystal layer, and a polarizing plate (not shown) placed on the surface on the opposite side of the substrate 101*b* from the liquid crystal layer.

As in the liquid crystal display device 100 of the first embodiment shown in FIG. 3, a common electrode (not shown) is mounted on the substrate 101*a*, and a segment electrode (not shown) is mounted on the substrate 101*b*. Each of the common electrode and the segment electrode is an ITO electrode, and has been subjected to patterning so that desired images can be displayed. Also, each of the common electrode and the segment electrode is connected to an external drive circuit (not shown). Alternatively, a segment electrode may be mounted on the substrate 101*a*, and a common electrode may be mounted on the substrate 101*b*.

Further, alignment films (not shown) are provided on the surfaces of the substrates 101*a* and 101*b*, with the surfaces facing each other substrate. Those alignment films are the same as the alignment films 105*a* and 105*b* provided on the substrates 101*a* and 101*b* in the liquid crystal display device 100 of the first embodiment shown in FIG. 3. Therefore, those alignment films are formed in the same manner as the alignment films 105*a* and 105*b*, and have vertical alignment properties. The liquid crystals have negative dielectric constant anisotropy, and are aligned perpendicularly to the substrates 101*a* and 101*b* in the initial alignment state. In the liquid crystal display device 600, a voltage is applied to the liquid crystal layer from the common electrode and the segment electrode. As the liquid crystals are tilted to be parallel to the substrates 101*a* and 101*b*, the optical anisotropy of the liquid crystal layer is changed, and an image is displayed.

As shown in FIGS. 7 and 8, an external ITO electrode 107 is provided on the surface of the substrate 101*a* on the observer's side (on the upper surface of the substrate 101*a* in FIG. 7). The external ITO electrode 107 can be provided on the entire surface of the substrate 101*a* on the observer's side.

Electrode pads 601 such as an electrode pad for extending the power supply (Vcc) wire from the external drive circuit and an electrode pad for extending the ground (GND) wire are formed on the surface of an end portion of the substrate 101*b* on the observer's side (the upper face of an end portion of the substrate 101*b* in FIG. 7) in the liquid crystal display device 600 of this embodiment. With the use of the electrode pads 601, a circuit unit 602 is formed between the external ITO electrode 107 and the ground.

Figure 9:
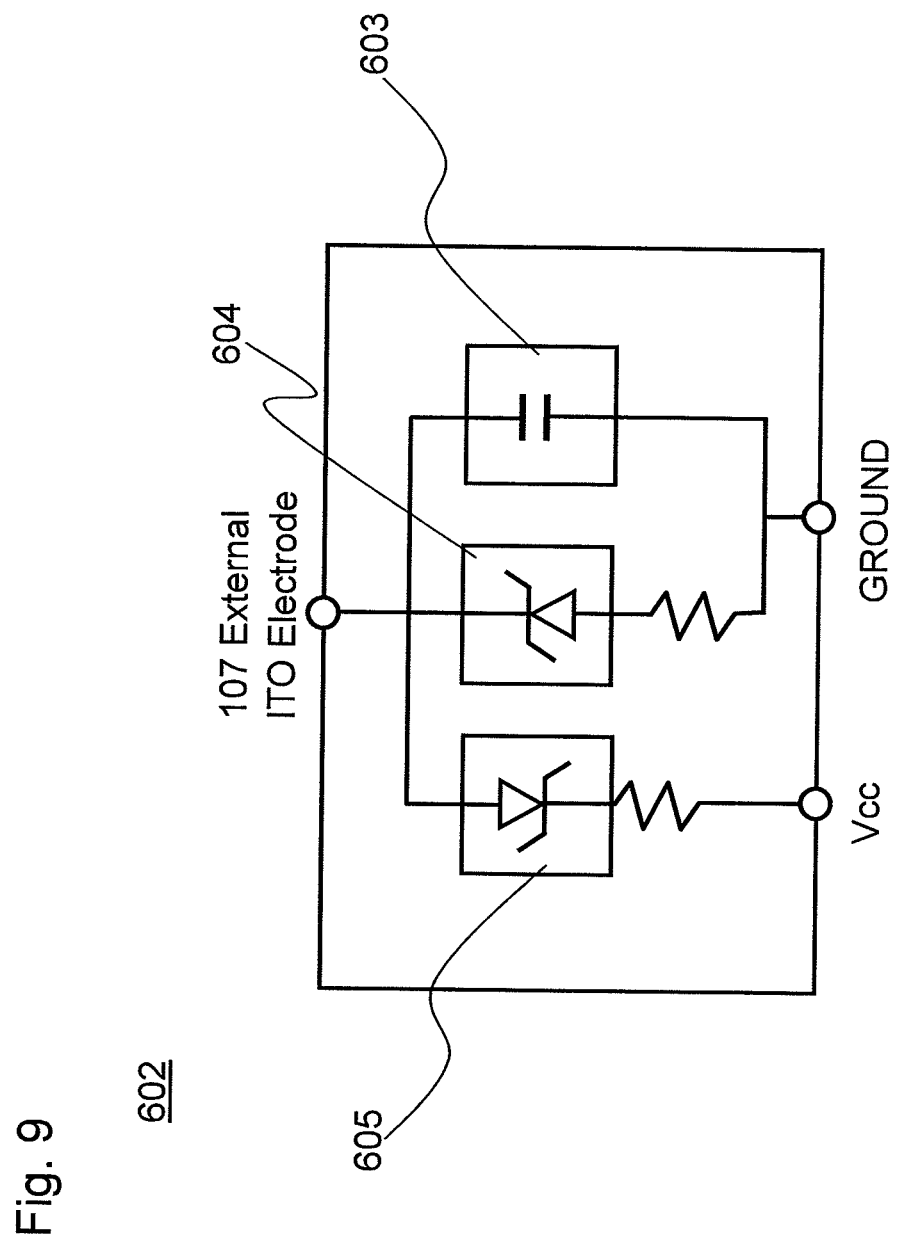
FIG. 9 is a circuit diagram for explaining the structure of a circuit unit formed in the liquid crystal display device according to the third embodiment.

FIG. 9 is a circuit diagram for explaining the structure of a circuit unit formed in the liquid crystal display device according to the third embodiment.

As shown in FIG. 9, a circuit unit 602 includes a capacitor 603 and two zener diodes: a first zener diode 604 and a second zener diode 605. The breakdown voltages of the first and second zener diodes 604 and 605 are set at the value of the mean voltage of the drive waveform of the liquid crystals.

As for the first zener diode 604, the anode is grounded, and the cathode is connected to the external ITO electrode 107. As for the second zener diode 605, the cathode is connected to the power supply (Vcc), and the anode is connected to the external ITO electrode 107.

Having the circuit unit 602 with the structure shown in FIG. 9, the liquid crystal display device 600 can disperse charges through the capacitor 603 when static electricity is applied from outside, and also can release the charges to the ground. At the same time, the DC potential remaining in the external ITO electrode 107 can be fixed substantially at the value of the mean potential of the drive waveform of the liquid crystals.

In this manner, regardless of whether the polarity of the static electricity from outside is positive or negative, the charges can be removed from the external ITO electrode 107, and the potential of the external ITO electrode 107 can be fixed at a certain value. When the liquid crystal display device 600 is used in a regular operation without static electricity, the external ITO electrode 107 can be in an electrically floating state.

Figure 10:
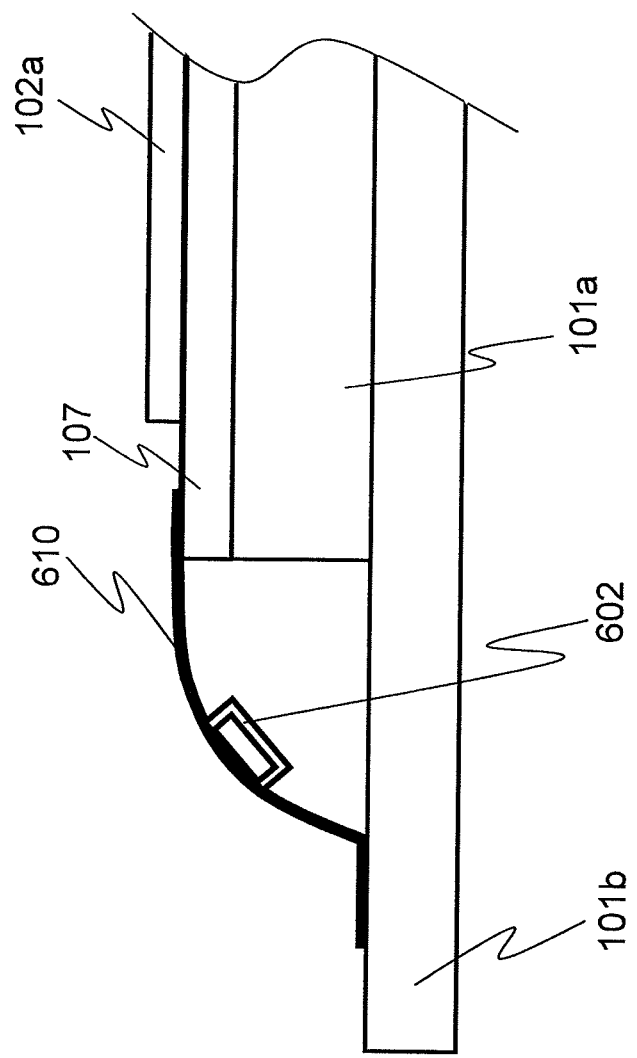
FIG. 10 is a schematic cross-sectional view for explaining a method of forming a circuit unit in the liquid crystal display device according to the third embodiment.

FIG. 10 is a schematic cross-sectional view for explaining a method of forming a circuit unit in the liquid crystal display device according to the third embodiment.

The circuit unit 602 is mounted on a flexible printed circuit (FPC) board 610, and is positioned between the external ITO electrode 107 on the substrate 101*a* and the electrode pads (not shown in FIG. 10) on the substrate 101*b*. The FPC board 610 includes an insulating layer made of polyimide or the like and a conductive layer made of copper or the like. The conductive layer is positioned on the bottom surface side (the lower surface side), and the circuit unit 602 is preferably mounted on the lower surface side facing the electrode pads and the like in FIG. 10. The FPC board 610 having the circuit unit 602 mounted thereon is positioned between the external ITO electrode 107 and the electrode pads so that the outer surface of the FPC board 610 is the surface to which the circuit unit 602 is not attached. Connections between those components are then established.

The electrical connection between the FPC board 610 having the circuit unit 602 mounted thereon and the external ITO electrode 107 can be established through a conductive tape connection or a pin connection, or can be established with the use of an anisotropically-conductive film (ACF) or the like.

In another example of the liquid crystal display device 600 according to the third embodiment of the present invention, another external ITO electrode can be provided on the surface on the opposite side of the substrate 101*b* having the electrode pads 601 from the observer's side or on the lower surface of the substrate 101*b* in the liquid crystal display device 600 shown in FIG. 7, as in the liquid crystal display device 300 shown in FIG. 4. This external ITO electrode can have the same structure as that of the external ITO electrode 107 on the substrate 101*a*. The external ITO electrode is connected to the external ITO electrode 107, and can serve to facilitate release of the charges accumulated due to static electricity and restrain the occurrence of display defects, by virtue of the effects of the circuit unit 602.

The capacitance of the capacitor 603 of the liquid crystal display element in the liquid crystal display device 600 should preferably be equal to or larger than the capacitance of the above-described capacitor formed between the external ITO electrode 107 and the segment electrode. More preferably, the capacitance of the capacitor 603 should be ten or more times larger than the capacitance of the capacitor formed between the external ITO electrode 107 and the segment electrode.

Further, the present invention is not limited to the above embodiments and various modifications can be made in the scope without departing from the purport of the present invention. For example, although the external electrode is disposed on the substrate, the present invention can also utilize the external electrode disposed on a polarizing plate.

The features and advantages of the present invention may be summarized as follows:

The present invention provides a liquid crystal display device that can restrain the occurrence of display defects even in a structure having a difference between an externally connected electrode potential and the mean potential of the drive waveform of liquid crystals.

The present invention also provides a liquid crystal display device that can reduce the difference between an externally connected electrode potential and the mean potential of the drive waveform of liquid crystals, and restrain the occurrence of display defects.

Obviously many modifications and variations of the present invention are possible in light of the above teachings. It is therefore to be understood that within the scope of the appended claims the invention may be practiced otherwise than as specifically described.

What is claimed is:

1. A liquid crystal display device comprising:
   first and second substrates that face each other;
   a liquid crystal layer sandwiched between the first and second substrates;
   first and second electrodes that face each other on opposite sides of the liquid crystal layer, wherein the first electrode is located on the first substrate, and the second electrode is located on the second substrate;
   a drive circuit connected to each of the first and second electrodes;
   an external electrode located on the first substrate, wherein the external electrode and the first electrode are located on opposite sides of the first substrate, with the first substrate and the first electrode between the external electrode and the liquid crystal layer,
   a capacitive structure is formed between the external electrode and the second electrode; and
   a capacitor connected to the external electrode, wherein the external electrode is grounded via the capacitor and the capacitor is connected in parallel with the capacitive structure.

2. The liquid crystal display device according to claim 1, wherein capacitance of the capacitor is equal to or larger than capacitances of the capacitive structure.

3. The liquid crystal display device according to claim 2, wherein the capacitance of the capacitor is at least ten times larger than the capacitance of the capacitive structure.

4. The liquid crystal display device according to claim 1, further comprising an arrester electrically connected in parallel with the capacitor.

5. A liquid crystal display device comprising:
   first and second substrates that face each other;
   a liquid crystal layer sandwiched between the first and second substrates;
   first and second electrodes that face each other on opposite sides of the liquid crystal layer, wherein the first electrode is located on the first substrate, and the second electrode is located on the second substrate;
   a drive circuit connected to each of the first and second electrodes;
   an external electrode located on the first substrate, wherein the external electrode and the first electrode are located on opposite sides of the first substrate, with the first substrate and the first electrode between the external electrode and the liquid crystal layer;
   a capacitor connected to the external electrode, wherein the external electrode is grounded via the capacitor; and
   an arrester electrically connected in parallel with the capacitor.

* * * * *